(12) United States Patent
Lu et al.

(10) Patent No.: US 7,236,328 B2
(45) Date of Patent: Jun. 26, 2007

(54) METHOD FOR PRODUCING A TRANSDUCER SLIDER WITH TAPERED EDGES

(75) Inventors: Jennifer Lu, San Jose, CA (US);
Dennis Richard McKean, San Jose, CA (US); Cherngye Hwang, San Jose, CA (US); Shi Ning, San Jose, CA (US)

(73) Assignee: Hitachi Global Storage Netherlands, B.V., Amsterdam (NL)

( * ) Notice: Subject to any disclaimer, the term of this patent is extended or adjusted under 35 U.S.C. 154(b) by 563 days.

(21) Appl. No.: 09/758,939

(22) Filed: Jan. 10, 2001

(65) Prior Publication Data

US 2002/0089787 A1 Jul. 11, 2002

(51) Int. Cl.
*G11B 15/64* (2006.01)

(52) U.S. Cl. .............. 360/235.1; 360/235.2; 360/235.3; 360/235.4; 360/235.5

(58) Field of Classification Search .......... 360/235.1, 360/235.2, 235.3, 235.4; 29/603.01, 603.07, 29/603.12, 603.15
See application file for complete search history.

(56) References Cited

U.S. PATENT DOCUMENTS

| | | | | |
|---|---|---|---|---|
| 3,922,776 A | * | 12/1975 | Alger et al. ............. 29/603.06 |
| 4,315,292 A | * | 2/1982 | Kronfeld ................. 360/246.2 |
| 4,928,195 A | | 5/1990 | Ezaki et al. |
| 5,079,600 A | * | 1/1992 | Schnur et al. ............. 257/750 |
| 5,285,517 A | * | 2/1994 | Wu ........................ 385/142 |
| 5,301,077 A | | 4/1994 | Yamaguchi et al. |
| 5,331,495 A | * | 7/1994 | Yoshida et al. ........... 29/603.1 |
| 5,473,485 A | | 12/1995 | Leung et al. |
| 5,516,323 A | * | 5/1996 | Carlson et al. ............... 451/28 |
| 5,761,003 A | | 6/1998 | Sato |
| 5,776,660 A | * | 7/1998 | Hakey et al. ............... 430/296 |
| 5,872,686 A | | 2/1999 | Dorius et al. |
| 5,889,637 A | | 3/1999 | Chang et al. |
| 5,903,969 A | * | 5/1999 | Haga ....................... 29/603.01 |
| 5,910,864 A | * | 6/1999 | Hira et al. ................ 360/235.9 |
| 5,928,813 A | * | 7/1999 | Krivokapic et al. ........... 430/5 |
| 5,939,227 A | * | 8/1999 | Smith ........................ 430/5 |
| 5,997,755 A | | 12/1999 | Sawada |
| 6,004,472 A | | 12/1999 | Dorius et al. |
| 6,033,766 A | * | 3/2000 | Block et al. ................. 428/432 |
| 6,069,769 A | * | 5/2000 | Dorius et al. ............. 360/235.6 |
| 6,198,601 B1 | * | 3/2001 | Hira et al. ................ 360/235.9 |
| 6,350,506 B2 | * | 2/2002 | Dickinson, Jr. ............. 360/135 |
| 6,870,707 B1 | * | 3/2005 | Zheng et al. ............ 360/235.6 |

* cited by examiner

*Primary Examiner*—Andrea Wellington
*Assistant Examiner*—Chrstopher R. Magee
(74) *Attorney, Agent, or Firm*—Mintz, Levin, Cohn, Ferris, Glovsky and Popeo, P.C.

(57) ABSTRACT

The present invention relates to a method for producing a transducer slider. The method involves first coating a substrate with a radiation-sensitive layer and exposing the radiation-sensitive layer to radiation according to an intensity pattern. Preferably, the intensity pattern is provided using a grayscale mask. Once the image is developed into the radiation-sensitive layer, the image is transferred into the substrate to form a transducer slider having a surface profile comprising a tapered edge. In the alternative or in addition, the surface profile may comprise a rounded corner. The invention also relates to a structure for forming a transducer slider.

28 Claims, 5 Drawing Sheets

METHOD FOR PRODUCING A TRANSDUCER SLIDER WITH TAPERED EDGES

TECHNICAL FIELD

This invention relates generally to transducer sliders and their manufacture, and more particularly relates to a method for producing magnetic head sliders with tapered edges using a patterned grayscale mask in conjunction with photolithography.

BACKGROUND

A magnetic storage system typically includes one or more magnetic disks with at least one data recording surface having a plurality of concentric tracks for storing data. A spindle motor and spindle motor controller rotate the disk(s) at a selected rotational velocity, typically measured in revolutions per minute (RPM), such that at least one read/write transducer or "head" per recording surface can read data from or write data to each recording surface. The data read or written from each recording surface is processed by a read/write channel. The transducer is supported by an air bearing slider that has a top surface attached to an actuator assembly via a suspension, and a bottom surface having an air bearing design of a desired configuration to provide favorable flying height characteristics. During the operation of the magnetic storage device, the air bearing slider is positioned above and in close proximity to the desired data track by an actuator assembly. The movement of the actuator assembly above the disk surface is controlled by a servo system. Such sliders have been described, e.g., in U.S. Pat. No. 5,889,637 to Chang et al., U.S. Pat. No. 5,473,485 to Leung et al, U.S. Pat. No. 5,761,003 to Sato, and U.S. Pat. No. 6,004,472 to Dorius et al.

Conventional magnetic storage systems may operate in a contact start/stop mode where the slider and transducer are only in contact with the recording surface when the spindle motor is powered down. As the disk begins to rotate, an air flow is generated which enters the leading edge of the slider and flows in the direction of the trailing edge of the slider. The air flow generates a positive pressure on the air bearing surface of the slider to lift the slider above the recording surface. As the spindle motor reaches the operating RPM, the slider is maintained at a nominal flying height over the recording surface by a cushion of air. Then, as the spindle motor spins down, the flying height of the slider drops until the slider is once again in contact with the disk.

In many conventional magnetic storage systems that operate in a contact start/stop mode, the slider drags on the disk surface until a sufficient pressure gradient is generated to lift the slider off the disk surface. This start-stop process leads to two problems at the head/disk interface: (1) wear of the disk surface (also referred to as wear durability); and (2) adhesion of the slider to the disk surface during start-up (also referred to as stiction).

One approach to circumvent the undesirable issues associated with wear durability and stiction is to use load/unload technology. Typically, load/unload technology includes a ramp for the slider/suspension assembly at the outer diameter of the disk, i.e., the landing zone, where the slider is "parked" securely while the spindle motor is powered down. During normal operation, the disk speed is allowed to reach a selected RPM (which may be below the normal operating RPM) before the head is loaded from the ramp onto the disk. As the slider approaches the disk surface, an air cushion is generated by the disk's rotation. The slider can also be unloaded from the disk's surface onto the ramp. In this manner, the slider is positioned over the disk without substantial contact with the disk surface. By reducing the contact between the slider and the disk surface, the interface life can be substantially increased. Because the slider and transducer are generally not in contact with the disk surface during start-up, stiction is not a problem. As such, a smooth (or non-textured) disk surface may be used with load/unload designs to decrease the head-to-disk spacing in order to increase the areal density of the disk.

One drawback in the use of a special landing zone is that such landing zones necessarily occupy about 5–8% of the disk surface. Thus, the disk surface cannot be employed as magnetic storage. Another drawback associated with load/unload designs is that when the slider is being "loaded" onto the disk surface, the slider may contact the disk surface before an air-bearing can be developed. This contact results in both slider wear and damage to the disk surface.

Furthermore, when the slider is being "unloaded" from the cushion of air above the disk surface onto the ramp, sliders having negative pressure air bearing designs generally resist being pulled away from the disk surface. The negative pressure region of the slider has a tendency to pull the slider toward the disk surface by a suction force as the suspension attempts to lift the slider. Eventually, the slider/suspension assembly overcomes this suction force in order to lift the slider onto the ramp. As soon as the suction force is released, the stored energy (often referred to as spring energy) within the suspension assembly causes the suspension to snap the slider away from the disk surface. This snapping motion causes the slider to oscillate or vibrate. Typically, at this point, the slider is just starting to ride up the ramp such that the corners, and possibly the edges, of the vibrating slider may contact the disk surface with sufficient force causing damage to the disk surface.

Typical sliders, including air bearing surfaces, have sharp corners and edges. One drawback of having an air bearing surface with sharp edges and corners is that during the contact start or stop, the sharp edges of the air bearing surface may cause deformations on the surface of the disk as the slider is being lifted off or placed onto the disk surface. One approach to reduce the amount of damage resulting from the slider-to-disk contact is to round the edges of the air bearing rails as shown in U.S. Pat. No. 4,928,195 to Ezaki et al. or to provide air bearing rails with beveled edges as shown in U.S. Pat. No. 5,301,077 to Yamaguchi et al. In addition, U.S. Pat. No. 5,872,686 to Dorius et al. describes an improved slider having rounded corners to minimize disk damage. In short, by rounding or beveling the air bearing rail edges, unwanted wear of the disk surface is reduced.

Rounded or beveled corners may be produced through mechanical material removal processes such as using cutting by abrasion means or through laser ablation in which high intensity light is used to evaporate material from sliders edges and corners. However, these processes only allow a few slider heads to be formed at a time and are thus economically infeasible. U.S. Pat. No. 5,997,755 to Sawada, as another example, describes a method of manufacturing a transducer with rounded corners. The patent describes an air bearing surface (ABS) and a second surface having edges at peripheries thereof formed by etching a disk-facing plane of a transducer slider. The disk-facing plane of the slider is coated with liquid resin, which is then dried. Due to surface tension effects, the resin thickness is thinner at the corners than the other portions of the ABS. After ion bombarding milling particles to the disk facing plane, the corners of the sliders are rounded. It should be evident that this method offers little if any control of the profile of the resin, and thus the corner rounding cannot be determined. Furthermore, this process is not adaptable for ABS pad edge blending.

Thus, there is a need in the art for a method for efficiently producing magnetic sliders having precisely controlled tapered edges and/or corners.

SUMMARY OF THE INVENTION

Accordingly, it is a primary object of the invention to address the above-described need in the art by providing a method for producing transducer sliders with rounded edges.

It is another object of the invention to provide such a method in which a plurality of transducer sliders are simultaneously produced inexpensively and controllably.

It is still another object of the invention to provide such a method through the use of grayscale photolithographic techniques.

It is a further object of the invention to provide a structure for forming a transducer slider with a tapered edge.

Additional objects, advantages and novel features of the invention will be set forth in part in the description which follows, and in part will become apparent to those skilled in the art upon examination of the following, or may be learned by practice of the invention.

In one aspect, then, the present invention relates to a method for producing a transducer slider. The method involves first coating a substrate with a radiation-sensitive layer and exposing the radiation-sensitive layer to radiation according to an intensity pattern. Preferably, the intensity pattern is provided using a grayscale mask. Once the image is developed into the radiation-sensitive layer, the image is transferred into the substrate to form a transducer slider having a surface profile comprising a tapered edge. This is typically done by removing material from the substrate according to the patterned layer to form the transducer slider. As a result, the tapered edge may correspond to a tapered edge of the patterned layer. In the alternative or in addition, the surface profile may comprise a rounded corner.

In another aspect, the invention relates to a structure for forming a transducer slider. The structure comprises a substrate and a patterned layer thereon having a tapered edge, wherein the patterned layer corresponds to a predetermined transducer slider surface profile. Typically, the patterned layer is polymeric and comprises substantially unexposed photoresist. Through etching accordingly to the patterned layer, the structure may be used to form a transducer slider having a predetermined surface profile that contains no exposed sharp edge. Optionally, the surface profile may contain two portions that intersect at a low angle.

In a further aspect, the invention relates to a method for producing a plurality of transducer sliders. A substrate is coated with a photosensitive layer which is then exposed to curing radiation according to a patterned grayscale mask to convert the photosensitive layer into a patterned layer having a tapered edge. Once material is removed or etched from the substrate according to the patterned layer to form a surface profile comprising a tapered edge that corresponds to the tapered edge of the patterned layer, the substrate is sectioned into a plurality of transducer sliders. Preferably, the substrate represents an assemblage of a plurality of substantially identical components that originates from a monolithic solid member.

BRIEF DESCRIPTION OF THE FIGURES

FIGS. 2A, 2B, 2C, 2D, 2E and 2F, collectively referred to as FIG. 2, schematically illustrate one embodiment of the inventive method.

FIGS. 4A, 4B, and 4C, collectively referred to as FIG. 4, schematically illustrate the formation of a substrate for use in preparing a plurality of transducer sliders using the inventive method.

FIGS. 5A, 5B, and 5C, collectively referred to as FIG. 5, schematically illustrate another way to form a substrate for use in preparing a plurality of transducer sliders using the inventive method.

DETAILED DESCRIPTION OF THE INVENTION

Definitions and Overview:

Before describing the present invention in detail, it is to be understood that this invention is not limited to materials (e.g., specific polymers or materials), processing conditions, manufacturing equipment, or the like, as such may vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a photosensitive layer" includes a plurality of photosensitive layers, reference to "a transducer slider" includes a plurality of sliders, and the like.

In describing and claiming the present invention, the following terminology will be used in accordance with the definitions set out below.

The term "array" used herein refers to a two-dimensional arrangement of items such as an arrangement of components that form a substrate. Arrays are generally comprised of regular, ordered components, as in, for example, a rectilinear grid, parallel stripes, spirals, and the like, but non-ordered arrays may be advantageously used as well. An array differs from a pattern in that patterns do not necessarily contain regular and ordered arrangement of components.

The term "etchant" is used in its ordinary sense and refers to matter that is capable of chemically, mechanically and/or physically removing material from a solid body. An "isotropic etchant" is an etchant that removes material from a solid surface in a direction-invariant manner, whereas an "anisotropic etchant" preferentially removes material from a solid surface in a particular direction, e.g., according to crystallographic orientation of the solid body or the direction of the light energy particles for light assisted etching.

The term "intensity pattern" refers to a pattern of radiation wherein different regions of the pattern have different amounts or degrees of radiation and there is continuous change in amount of degree of radiation moving from one region to another region in the pattern. A "gray scale mask," referring to a mask that on which a pattern is formed such that the pattern is represented by regions that exhibit continuously varying optical densities, may be used to provide a photonic intensity pattern.

"Optional" or "optionally" means that the subsequently described circumstance may or may not occur, so that the description includes instances where the circumstance occurs and instances where it does not.

The term "polymer" is used herein in its conventional sense to refer to a compound having two or more monomer units, and is intended to encompass homopolymers as well as copolymers, including, for example, graft copolymers. Those compositions herein that are referred to as "radiation-sensitive" are typically polymeric and exhibit different removal properties after exposure to electromagnetic radiation. For example, radiation-sensitive compositions may exhibit increased mechanical integrity resulting from radiation-initiated crosslinking or decreased mechanical integrity resulting from radiation-initiated breakdown. Examples of radiation-sensitive compositions include, but are not limited to, positive and, less commonly, negative resists, responsive to photon or electron beams.

The term "radiation" used herein refers to energy radiated or transmitted in the form of rays, waves, or particles that is induces a response in a radiation-sensitive composition. While the term radiation usually refers to electromagnetic radiation, e.g., ultraviolet light, other types of radiation, e.g., electron beam, may be used in some instances. The prefix "photo" used herein refers to photonic radiation. Thus, a photosensitive composition, for example, refers to compositions that are sensitive to photons.

The term "substrate" is used herein in its ordinary sense and means a body or base layer onto which another layer, e.g., a radiation-sensitive layer, is deposited. A substrate is used to provide the solid material from which the transducer slider is formed.

The term "tapered" as used herein refers to a surface profile of the transducer slider which gradually decrease in thickness toward one end. As used herein, the term tapered also encompasses "rounded" and "beveled" in which sharp corners or edges are blended to render less distinct the surfaces that form the sharp corners and edges.

The Inventive Methods and Structures:

In one aspect, then, the invention relates to a method for producing a transducer slider. The method involves first coating a substrate with a radiation-sensitive layer, preferably a photosensitive layer. The radiation-sensitive layer is exposed to radiation according to an intensity pattern, preferably through the use of a grayscale mask, to convert the radiation-sensitive layer into a patterned layer having a tapered edge. Then, material is etched or otherwise removed from the substrate according to the patterned layer to form a transducer slider having a surface profile comprising a tapered edge that corresponds to the tapered edge of the patterned layer.

Figure 1:
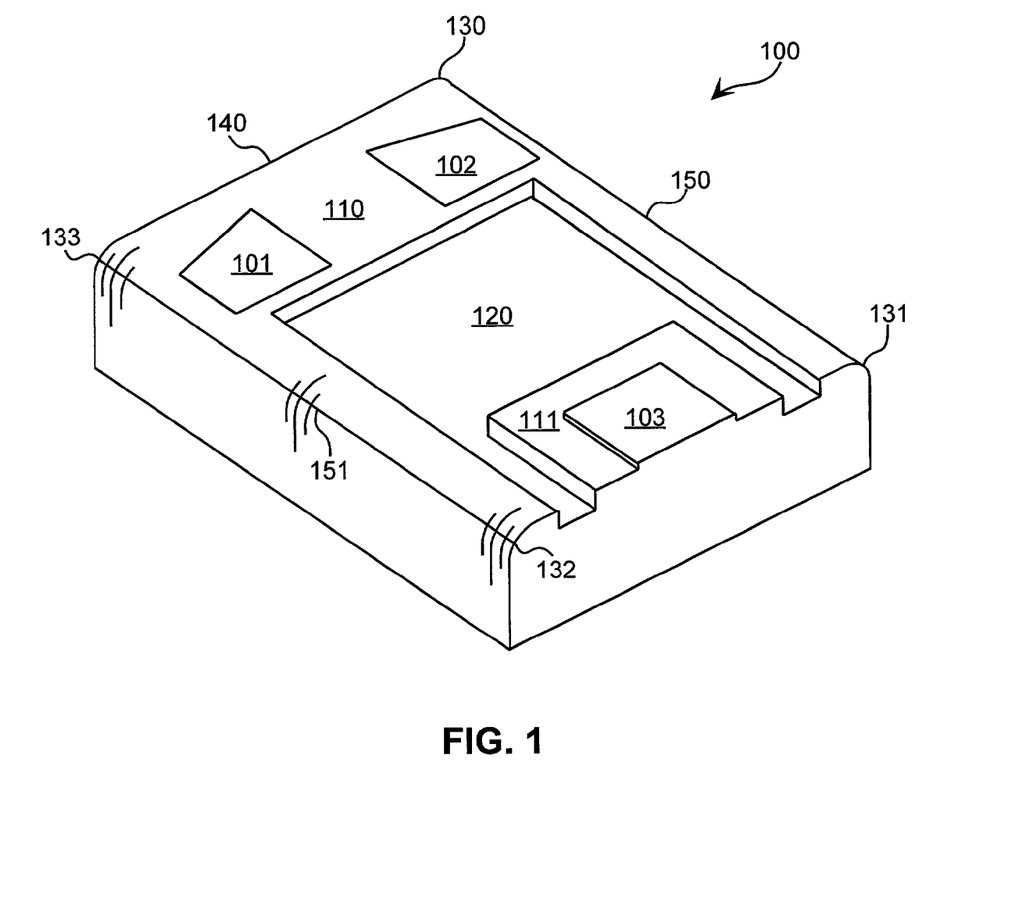
FIG. 1 schematically illustrates a prior art transducer slider having rounded corners and edges.

In order to illustrate how the inventive method may be used to form a transducer slider, a prior art slider is illustrated in FIG. 1. As with all figures referenced herein, in which like parts are referenced by like numerals, FIG. 1 is not to scale, and certain dimensions may be exaggerated for clarity of presentation. The air bearing design of slider 100 includes leading pads 101 and 102 disposed on a first shallow step region 110. Additionally, the air bearing design of slider 100 includes a trailing pad 103 disposed on a second shallow step region 111. Leading pads 101 and 102 and trailing pad 103 form the air bearing surface of slider 100. The shallow step regions 110 and 111 are approximately the same etch depth with respect to the air bearing surface and therefore forming the first etch surface.

The shallow step region 110 extends along the leading edge 140 of slider 100 and has side rails that extend along the side edges 150 and 151 of slider 100. The shallow step regions 110 and 111 or the first etch surface provide the positive pressure regions of slider 100. More specifically, the shallow step region 110 pressurizes leading pads 101 and 102 and shallow step region 111 pressurizes trailing pad 103 during operation to give slider 100 a positive lift. Pressurization mainly occurs at the step transition between the shallow step regions and the air bearing pads. The negative pressure region 120, also referred to as the second etch surface, is responsible for pulling slider 100 towards the disk surface during operation. During operation, the disk is rotating and the slider is flying above the disk surface. In general, the negative and positive pressure regions of slider 100 are counterbalanced to provide a relatively flat flying height profile.

FIG. 1 also illustrates rounded corners indicated at 130, 131, 132 and 133, respectively. More specifically, these corners are rounded in three dimensions to have a generally spherical shape or some other similar curvature. In addition, side edges 151 and 150 and leading edge 140 are also rounded to have a cylindrical shape or some other similar curvature. The inventive method allows efficient and controlled production of such rounded corners and edges.

FIG. 2 schematically illustrates one embodiment of the inventive method using photolithographic techniques for producing a transducer slider, particularly a magnetic head slider having a surface profile comprising a tapered edge. FIG. 2A illustrates a substrate 11 having a surface 13 on which a photosensitive layer 15 applied. As shown, the substrate 11 is generally in the shape of a rectangular block, but this is not a requirement. As the inventive method involves shaping the substrate 11 into the transducer slider by removing material from surface 13, the substrate 11 may be composed of any material suitable for use as a transducer slider having appropriate thermal, electrical, magnetic and mechanical properties. Typically, sliders for magnetic heads are made from a hard material having a high modulus of elasticity. Such materials include ceramics such as carbides, nitrides, and oxides. Carbides such as aluminum carbide, silicon carbide, titanium carbide, boron carbide, germanium carbide, tungsten carbide, and mixed-metal carbides (e.g., AlTiC or $Al_2O_3TiC$) are generally preferred but other materials such as titanium oxide, silicon nitride and silicon may be used as well. In addition, it is preferred that the substrate is sized to require only minimal material removal in order to form the transducer slider.

Figure 2A:
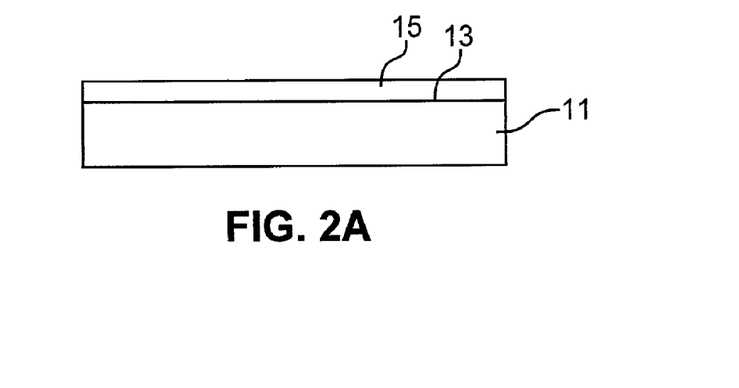
FIG. 2A illustrates the application of a photoresist layer on a substrate.

As shown in FIG. 2A, the photosensitive layer 15 is applied uniformly on substrate surface 13. The photosensitive layer 15 has a thickness selected to provide the desired profile in the substrate as discussed below. Typically, although not necessarily, the photosensitive layer 15 is composed of a positive photoresist composition, i.e., a composition that becomes more easily removed after exposure to radiation. Positive photoresists may include polymeric materials with weak links that degrade by the process of scission or contain a photoactive component that renders the composition more soluble to a solvent upon irradiation. Thus suitable photosensitive compositions that can serve as positive photoresists generally comprise polymeric materials such as poly(methyl methacrylate) ("PMMA") or copolymers thereof such as poly(methyl methacrylate-co-t-butylmethacrylate), a poly(lactide) such as poly(lactide-co-glycolide), polymethacrylamide, polyoxymethylene, polyalkenesulfone, or poly(glycidylmethacrylate-co ethyl acrylate). Preferred compositions typically contain from phenolic polymers such as novolacs along with photoactive components such as diazonaphthoquinones. One of ordinary skill in the art may select and optimize photoresist compositions through routine experimentation. The resist is deposited using any of a number of conventional techniques such as spin coating or the like. For example, the resist may be provided in a liquid solvent, spin coated on the substrate surface, and heated to remove the solvent. As a result, the resist layer typically has a thickness of about 1 to about 20 µm, optionally about 2 to about 10 µm.

Figure 2B:
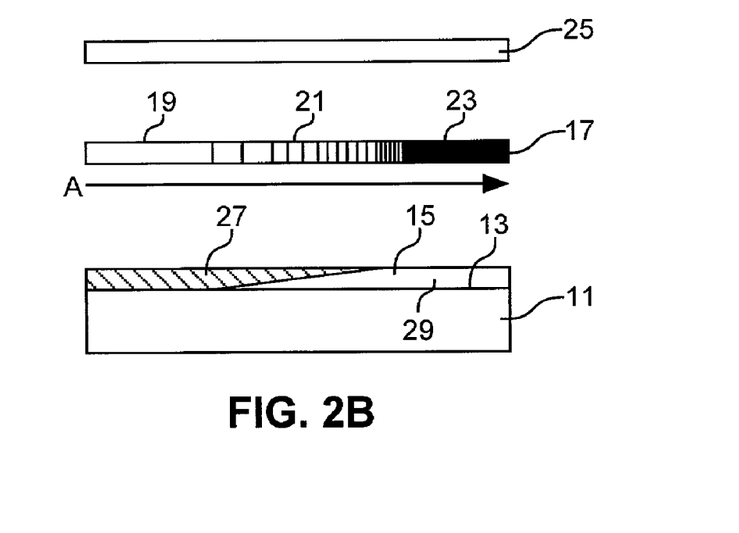
FIG. 2B illustrates the conversion of the photosensitive layer to a patterned layer using a grayscale mask.

FIG. 2B illustrates the patterning of the photosensitive layer 15 on the substrate surface 13 by using a grayscale mask 17. The grayscale mask 17 is patterned in order to form a tapered feature in the photosensitive layer. As such, the pattern in the grayscale mask 17 has a transparent region 19, a transition region 21 and an opaque region 23 along the direction indicated by arrow A. As shown, the optical density to the transition region 21 gradually increases from the transparent region 19 to the opaque region 23. A source of electromagnetic radiation 25 is provided in order to generate radiation, preferably substantially collimated, having a wavelength to which the photosensitive layer 15 is responsive. Typically, the wavelength is an ultraviolet wavelength. The grayscale mask 17 is placed between the radiation source 25 and the photosensitive layer 15 in order to expose the first photosensitive layer 15 to electromagnetic radiation according to the pattern. As a result, radiation is transmitted through the transparent region 19 and the transition region 21 of the mask. Because radiation transmitted through the transparent region 19 is more intense than radiation transmitted through the transition region 21, radiation transmitted through the transparent region 19 penetrates the photosensitive layer to a greater depth as a whole than radiation transmitted through the transition region 19. Thus, the depth of the exposed region 27 of the photosensitive layer corresponds inversely to the optical density of the grayscale mask 17. Similarly, the height of the unexposed regions 29 corresponds directly to the optical density of the grayscale mask 17. As a result, the photosensitive layer is converted into a patterned layer comprising the exposed and the unexposed regions.

A number of types of grayscale masks are commercially available. Canyon Materials, Inc. (San Diego, Calif.), for example, offers a line of High Energy Beam Sensitive (HEBS) glass photomasks for use in HEBS Glass gray scale photolithography. HEBS glass gray scale photomasks are generally considered to be true gray scale masks, not half-tone masks. Patterns having up to more than 500 gray levels can be written on such masks with an E-beam pattern generator. The image is written within a 1 micron thick E-beam sensitive glass layer, the optical density of which is determined by the electron dosages. Other grayscale masks may be used as well for the present invention.

Figure 2C:
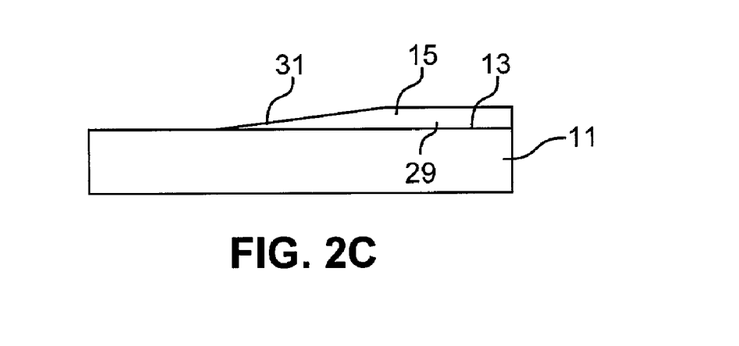
FIG. 2C illustrates the removal of the exposed portions of the patterned layer.

FIG. 2C illustrates the development of the exposed photosensitive layer to remove the exposed region 27 of the photosensitive layer 15. In this case, the exposed portion is washed away with a solvent, organic or inorganic (aqueous or nonaqueous), leaving the unexposed region 29 intact and adhering to the substrate surface 13. Due to the use of the grayscale mask 17 as described above, the unexposed region 29 has a tapered edge 31. One way to facilitate the formation of such a tapered edge is to use a low contrast photosensitive composition. One of ordinary skill in the art will recognize that there are many commercially available photosensitive compositions having different response conditions and that custom photosensitive compositions may be formulated. It should be noted that as a general rule, photoresists are typically formulated for high contrast performance to produce features with sharp edges. Mixtures of commercially available photoresist may be preferred as the photosensitive layer as mixtures since mixtures tend to exhibit lower contrast resulting in features with rounded edges.

Figure 2D:
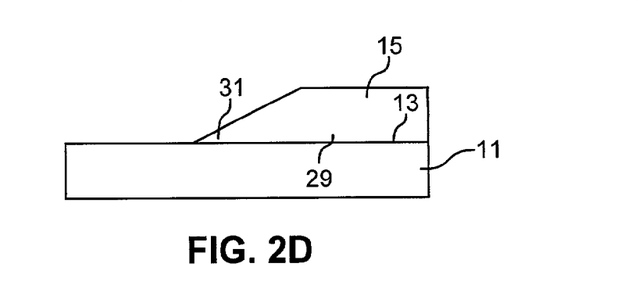
FIG. 2D illustrates the initial exposure of the substrate and the patterned layer to an etchant.
Figure 2E:
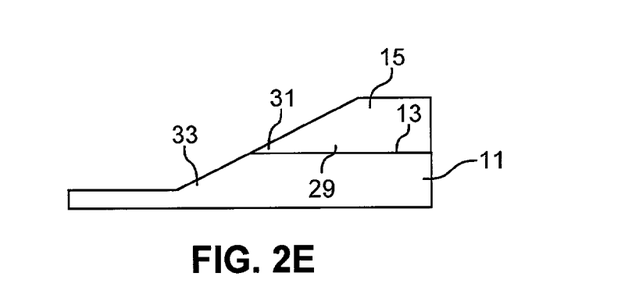
FIG. 2E illustrates continued exposure of the substrate and the patterned layer resulting in the simultaneous removal of the substrate material and the patterned layer.
Figure 2F:
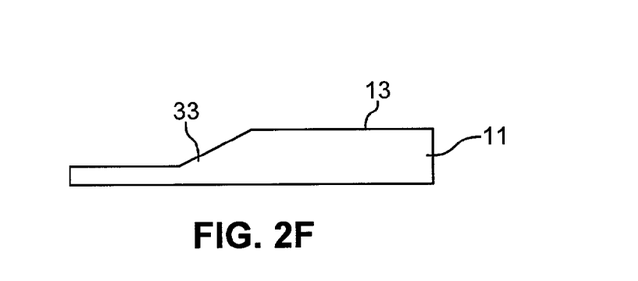
FIG. 2F illustrates a final profile of the substrate.

After forming the patterned layer, material is removed from the substrate according to the patterned layer to form a transducer slider having a surface profile comprising a tapered edge that corresponds to the tapered edge of the patterned layer. This is typically done by exposing the substrate to an etchant. The etchant is preferably an ionized gas such as argon-based plasma or ion beam, but may in some instances be a liquid etchant. Also preferably, the etchant is an isotropic etchant, exhibiting no difference in directional etching rate with respect to the substrate. FIG. 2D illustrates the initial exposure of the substrate and the patterned layer of FIG. 2C to an isotropic etchant. The etchant first removes material from the exposed portion of the substrate surface 13. However, as the etchant also removes material from the exposed portion of the patterned layer. As shown by FIG. 2D, the material removal from the substrate also undercuts the tapered edge 31 of the patterned layer 15. FIG. 2E illustrates continued exposure of the substrate 11 and the patterned layer 15 to the etchant. It is evident that the etching process simultaneously moves material from the substrate 11 and the patterned layer 15 thereby causing "movement" of the tapered edge 31 of the patterned layer to reveal additional substrate surface for exposure to the etchant. As a result, FIG. 2E illustrates the etchant removing material from the substrate to form a surface profile comprising a tapered edge 33 that corresponds to the tapered edge 31 of the patterned layer before exposure to the etchant. FIG. 2F illustrates a final profile of the substrate after removal of the layer of photoresist.

Figure 3:
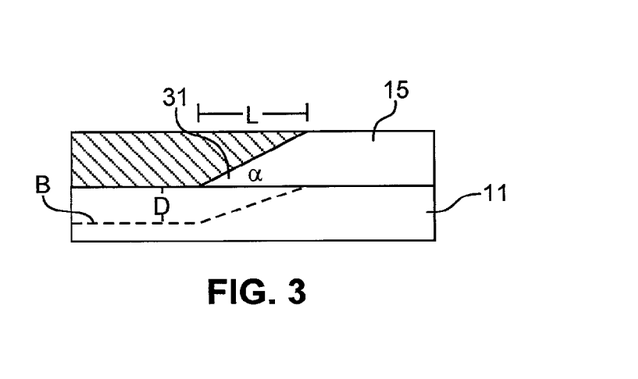
FIG. 3 illustrates the geometric considerations in providing a patterned layer in order to achieve the desired substrate etch profile.

FIG. 3 illustrates the geometric considerations in providing a patterned layer in order to achieve the desired substrate etch profile. FIG. 3 schematically illustrates in cross-sectional view a patterned layer 15 having a tapered edge 31 on a substrate 11 before exposure to an etchant. Dotted line B indicates the surface profile of the substrate after etching. It has been found that pattern profile is related to the surface profile by the following equations:

$$t = (1 - 0.7\beta) D/K \text{ and} \quad (I)$$

$$\alpha = \arctan K \quad (II)$$

where t is the resist thickness at the edge of the pad, α is the resist taper angle, D is the etch depth, β is the ratio of taper length, L of the etch profile over D and K is the ratio of etch rate over substrate etch rate.

The method of the present invention can also be used for form rounded corners on the sliders.

In another aspect, the invention relates to a structure for forming a transducer slider. The structure comprises a substrate and a patterned layer thereon having a tapered edge, wherein the patterned layer corresponds to a predetermined transducer slider surface profile. This structure may be formed by a number of techniques one of which has been discussed above. Accordingly, the patterned layer may be polymeric and/or composed of substantially unexposed resist. In the alternative, the patterned layer may be formed on the surface by depositing layers of non-polymeric material, e.g., metals or ceramics, through vapor deposition, sputtering, and/or other known semiconductor processing techniques. This structure may be used to from a transducer slider having a surface profile that contains no exposed sharp edge. A preferred use of this structure is to form a transducer slider surface profile that contains two portions that intersect at an angle of about 0.5 to about 10 degrees. A more preferred use of this structure is to form such a slider wherein the angle from about 1 to about 5 degrees.

In a further aspect, the invention relates to a method for producing a plurality of transducer sliders. The method involves coating a substrate with a photosensitive layer which is then exposed to curing radiation according to a patterned grayscale mask to convert the photosensitive layer into a patterned layer having a tapered edge. Once conversion has taken place, material is removed from the substrate according to the patterned layer to form a surface profile comprising a tapered edge that corresponds to the tapered edge of the patterned layer. Then, the substrate is sectioned into a plurality of transducer sliders.

Figure 4A:
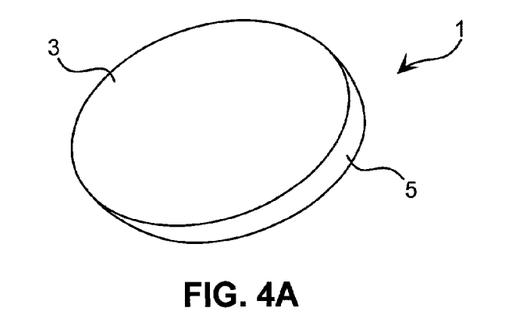
FIG. 4A illustrates a monolithic solid disk.
Figure 4B:
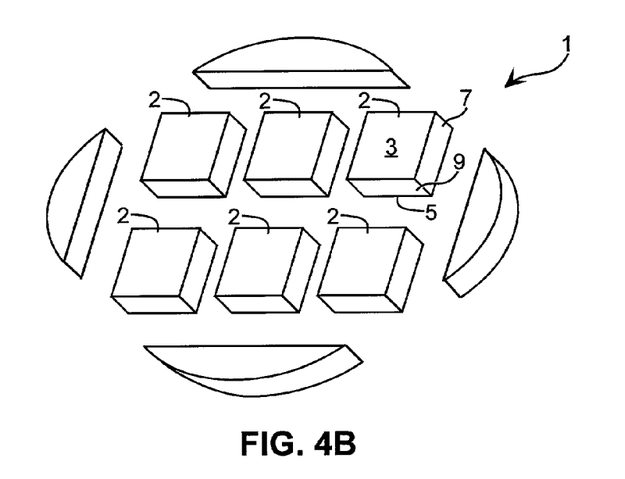
FIG. 4B illustrates the cutting of the disk into a plurality of substantially identical rectangular pieces that will each be formed into a transducer slider.
Figure 4C:
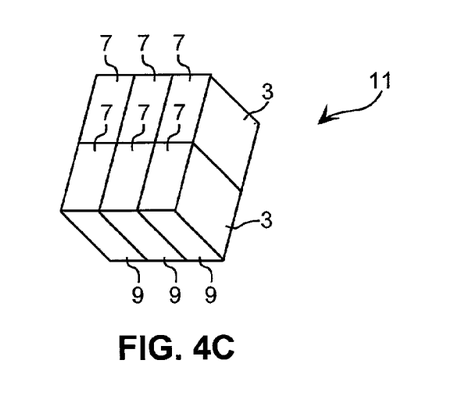
FIG. 4C illustrates the assembling of the plurality of pieces into a rectilinear array to form the substrate.

The substrate may be formed by first cutting a monolithic solid member into a plurality of components. When this is the case, the monolithic solid member may be cut into substantially identical components which may be then assembled in an array, preferably a rectilinear array to form the substrate. For example FIG. 4 schematically illustrates the formation of a substrate for use in preparing a plurality of transducer sliders using the inventive method. The substrate material may be grown or prepared in bulk, and depending on desired properties, the material may have a single crystalline, multicrystalline, or amorphous microstructure. Examples of techniques in which the substrate material may be prepared include Czochralski, float zone and other methods known in the art. FIG. 4A illustrates a monolithic solid disk 1 having an upper surface 3 that opposes a lower surface 5. Such disks may be cut from a cylindrical crystal that typically characterize crystals grown using the Czochralski technique. FIG. 4B illustrates the sectioning of the disk 1 into a plurality of substantially identical rectangular pieces 2 that will each be formed into a transducer slider. Each piece 2 has an upper surface 2, a lower surface 5, two longer side surfaces 7 and two shorter side surfaces 9. The rectangular pieces 2 are then assembled, as illustrated in FIG 4C, into a rectilinear array to form the substrate 11. As shown, the pieces are assembled such that side longer side surfaces form a larger surface to allow for a layer to be applied thereon to control material removal according to the inventive method.

Figure 5A:
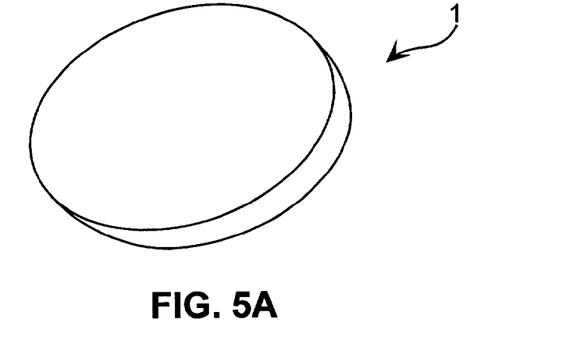
FIG. 5A illustrates a monolithic solid disk.
Figure 5B:
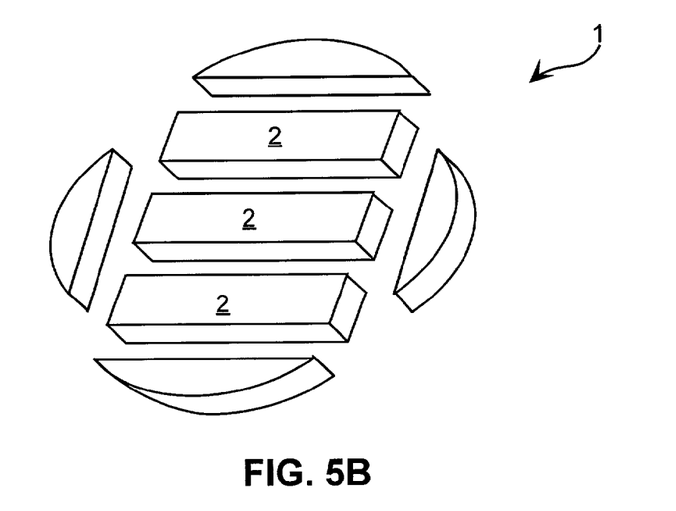
FIG. 5B illustrates the cutting of the disk into a plurality of substantially identical rectangular bars.
Figure 5C:
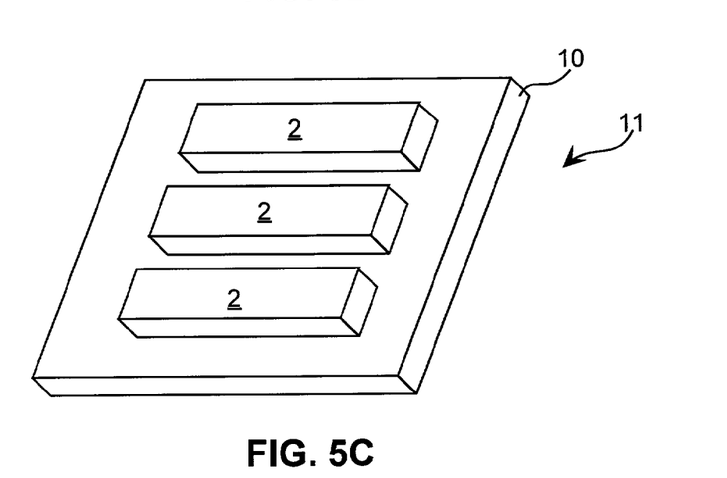
FIG. 5C illustrates the mounting of the bars in rows on a carrier.

Alternatively, as illustrated in FIG. 5, wafers are sliced into bars which are arranged in rows and mounted to a carrier to form an assembly. FIG. 5A illustrates a monolithic wafer disk 1. FIG. 5B illustrates the cutting of the disk 1 into a plurality of substantially identical rectangular bars 2. FIG. 5C illustrates the mounting of the bars 2 in rows on a carrier 10. The assembly may serve as a substrate 11 that undergoes the inventive patterning processing to form tapered edges/corners. The bars are then demounted from the carrier 10 and cut into individual sliders (not shown). It should be evident to one of ordinary skill in the art, then, that there are many ways in which the substrate may be formed from a plurality of components.

From the above description, it should be apparent that the present invention provides a number of advantages over prior methods in forming transducer sliders with rounded edges and/or corners. For example, mechanical and laser ablation techniques are known in the art to for corner rounding. However, these techniques are slider level processes which are generally cost prohibitive because sliders have to be individually handled. Moreover, the invention provides precision control in edge blending unavailable in known methods. In short, the invention provides a method in which transducer sliders having rounded corners and/or edges can be produced inexpensively and controllably.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains. All patents cited herein are incorporated by reference in their entireties.

We claim:

1. A method for producing a transducer slider having at least one tapered edge, comprising:
   (a) coating a substrate with a radiation-sensitive layer;
   (b) imagewise exposing the radiation-sensitive layer to radiation according to an intensity pattern having a gradient conforming to said at least one tapered edge, said intensity pattern enabling specific levels of removal of portions of the radiation sensitive layer corresponding to the specific intensity pattern used;
   (c) developing the image into the radiation-sensitive layer; and
   (d) transferring the image into the substrate to form a transducer slider having a surface profile comprising said at least one tapered edge and a predetermined surface profile as provided by the specific intensity pattern used, wherein the predetermined surface profile contains no exposed sharp edge which might contact a disk surface when the transducer slider is in use.

2. The method of claim 1, wherein the radiation-sensitive composition is spin coated on the substrate.

3. The method of claim 2, wherein heat is applied to the radiation-sensitive layer after (a) and before (b).

4. The method of claim 3, wherein the application of heat results in solvent evaporation from the radiation-sensitive layer.

5. The method of claim 1, wherein the radiation-sensitive layer is a positive resist.

6. The method of claim 1, wherein the radiation-sensitive layer is a low contrast resist.

7. The method of claim 1, wherein the radiation-sensitive layer has a thickness of about 1 to about 20 µm.

8. The method of claim 7, wherein the radiation-sensitive layer has a thickness of about 2 to about 10 µm.

9. The method of claim 1 wherein the radiation is photonic.

10. The method of claim 1, wherein the radiation has an ultraviolet wavelength.

11. The method of claim 1, wherein the intensity pattern is provided using a grayscale mask.

12. The method of claim 11, wherein the patterned gray-scale mask is electron-beam sensitive.

13. The method of claim 12, wherein the tapered edge corresponds to a portion of the patterned gray scale mask that has not been exposed to an electron beam.

14. The method of claim 1, wherein a solvent is applied to the radiation-sensitive layer after (b) and before (c).

15. The method of claim 14, wherein the image is developed into the exposed portion of the radiation-sensitive layer by the solvent during (c).

16. The method of claim 1, wherein the substrate is exposed to an etchant during (c).

17. The method of claim 16, wherein the etchant comprises a gas.

18. The method of claim 17, wherein the gas comprises plasma.

19. The method of claim 18, wherein the plasma is argon based.

20. The method of claim 16, wherein the etchant comprises a liquid.

21. The method of claim 15, wherein the etchant is an isotropic etchant.

22. The method of claim 1, wherein simultaneous removal of the patterned layer is carried out during (d).

23. The method of claim 1, wherein the substrate comprises a ceramic material.

24. The method of claim 23, wherein the ceramic material comprises carbide.

25. The method of claim 24, wherein the carbide is selected from the group consisting of aluminum carbide, silicon carbide, titanium carbide, boron carbide, geranium carbide, tungsten carbide, and mixed-metal carbide.

26. The method of claim 23, wherein the ceramic material comprises a nitride.

27. The method of claim 23, wherein the ceramic material comprises an oxide.

28. The method of claim 16, wherein the intensity pattern's relationship to the predetermined surface profile has been determined by using the equations $t=(1-0.7\beta)D/K$ and $\alpha=\arctan K$, where t is the thickness of the radiation-sensitive layer at an edge of a mass of that layer, a is the taper angle of the radiation-sensitive layer, D is the etch depth resulting from exposure to the etchant, $\beta$ is the ratio of taper length L of the etch profile over D, and K is the ratio of etch rate over substrate etch rate.

* * * * *

UNITED STATES PATENT AND TRADEMARK OFFICE
CERTIFICATE OF CORRECTION

PATENT NO. : 7,236,328 B2  Page 1 of 1
APPLICATION NO. : 09/758939
DATED : June 26, 2007
INVENTOR(S) : Jennifer Lu et al.

It is certified that error appears in the above-identified patent and that said Letters Patent is hereby corrected as shown below:

TITLE PAGE,
Item (73): The assignees of the subject application should be:

--Hitachi Global Storage Technologies Netherlands B.V.--

Signed and Sealed this

Eighteenth Day of September, 2007

JON W. DUDAS
*Director of the United States Patent and Trademark Office*